Aug. 10, 1943.    J. D. McDONALD    2,326,546
BAKING PAN
Filed Nov. 10, 1941    2 Sheets-Sheet 1
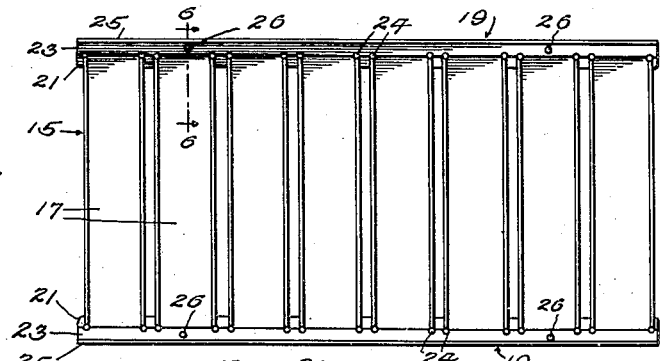
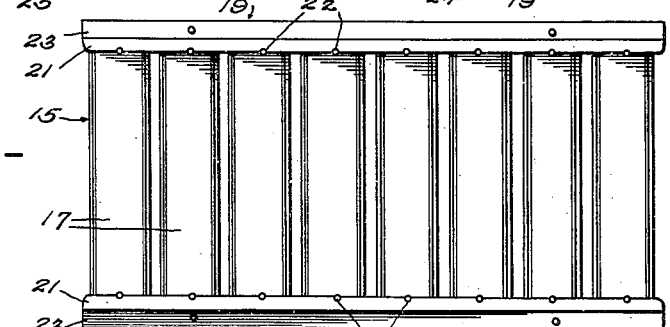
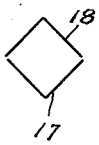
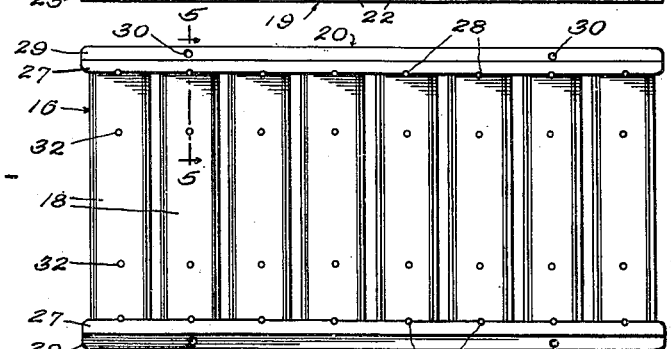
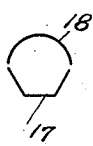
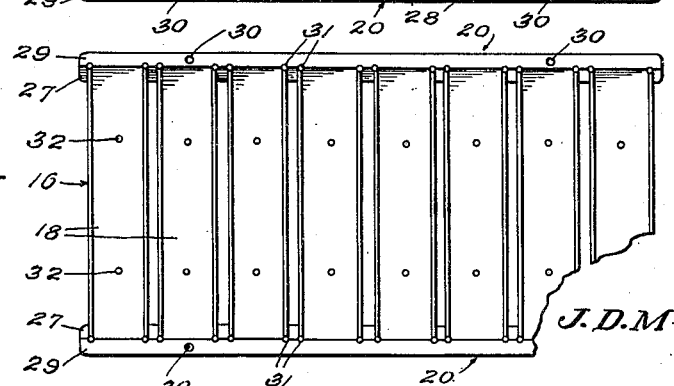
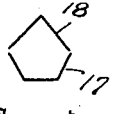
Inventor
J. D. McDonald
By H. B. Wilson &Co.
Attorneys Aug. 10, 1943. J. D. McDONALD 2,326,546
BAKING PAN
Filed Nov. 10, 1941 2 Sheets-Sheet 2
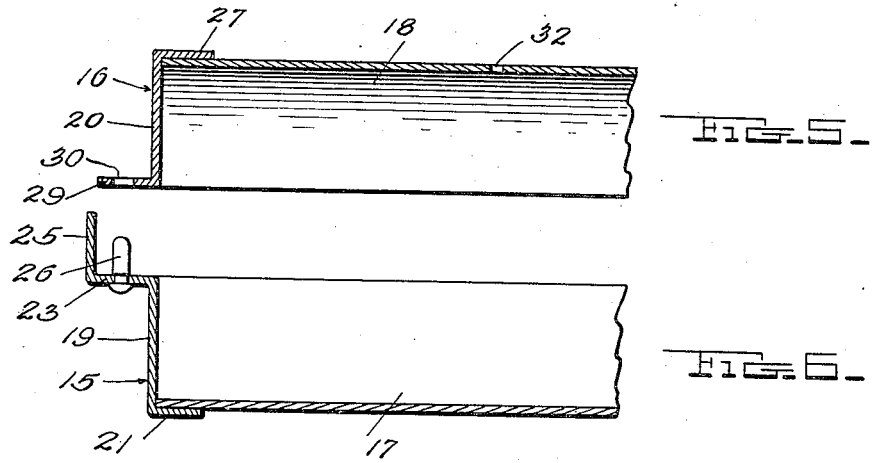
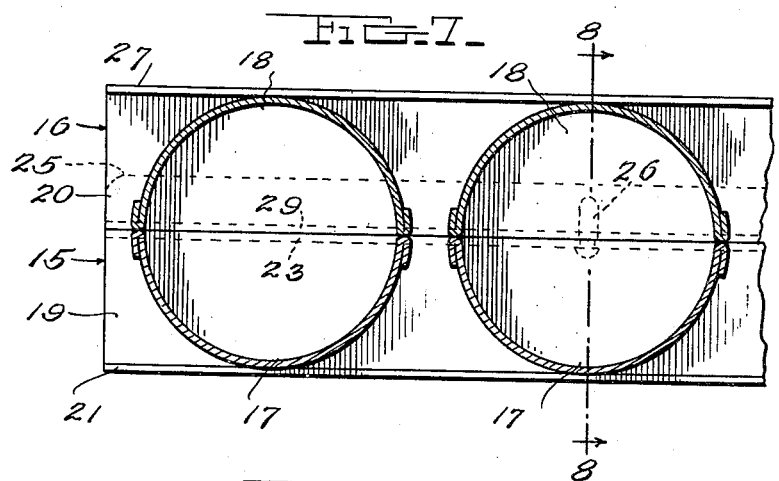
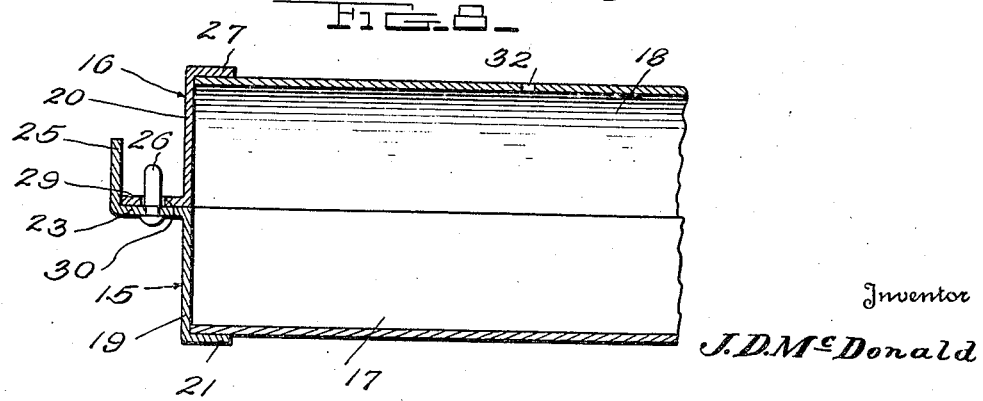
Inventor
J. D. McDonald
By H. B. Wilson & Co.
Attorneys Patented Aug. 10, 1943

2,326,546

UNITED STATES PATENT OFFICE 2,326,546

BAKING PAN

Jesse D. McDonald, Enid, Okla., assignor of one-third to John E. Thomas, Enid, Okla.

Application November 10, 1941, Serial No. 418,567

2 Claims. (Cl. 53—6)

The invention aims to provide a new and improved baking pan for baking elongated buns or rolls with a crust entirely around the periphery and on both ends, and the pan consists of novel upper and lower sections detachably connected in a simple and advantageous manner.

Figure 1 is a top plan view of the bottom section of the improved pan.

Figure 2 is a bottom view of said bottom section.

Figure 3 is a top plan view of the top section.

Figure 4 is a bottom view of said top section.

Figures 5 and 6 are enlarged detail vertical sections as indicated by the lines 5—5 and 6—6 of Figures 3 and 1 respectively, showing portions of the two pan sections in juxtaposition.

Figure 7 is an enlarged vertical longitudinal sectional view through portions of the two pan sections assembled.

Figure 8 is a vertical transverse section on line 8—8 of Fig. 7.

Figures 9, 10, 11 and 12 are diagrammatic views illustrating some of the various transverse shapes which may be given to the semi-tubular pans and their semi-tubular covers.

A construction has been illustrated which has proven to be advantageous from standpoints of manufacture, sale and use, and while this construction will be specifically described, minor variations may of course be made within the scope of the invention as claimed.

The lower section of the improved pan is indicated in a general way by the reference character 15, and the upper section by the character 16, said lower section having a plurality of separate, spaced, upwardly open semi-tubular pans 17 and said upper section having separate, spaced, downwardly open semi-tubular covers 18 for said pans. The pans 17 and covers 18 cooperate in forming separate tubular members each of which is peripherally exposed throughout its circumference and length, whereby the oven heat when baking will entirely surround each of said tubular members to produce a thoroughly and uniformly baked product. When the dough is placed in the pans 17 of the lower section 15, the upper section 16 applied, and the dough baked, this dough of course rises and fills the pan covers 18, the pans and their covers then cooperating in forming molds for the buns or rolls being baked, and these buns or rolls will have a crust entirely around their peripheries and on both ends, tending to keep their interior portions fresh for an unusual length of time. In the main views, the pans 17 and covers 18 are each of semi-cylindrical form to provide cylindrical buns or rolls, but the shape of said pans and covers may be varied in any of numerous ways, some of which are diagrammatically illustrated in Figs. 9 to 12.

Two parallel longitudinal side bars 19 extend across the ends of the pans 17 and close said ends, and two upper parallel longitudinal side bars 20 extend across the ends of the pan covers 18 and close same. The lower longitudinal edges of the side bars 19 are bent horizontally inward to provide flanges 21 which are secured against the bottoms of the pans 17, preferably by spot welding as indicated at 22 in Fig. 2. The upper longitudinal edge portions of these same side bars 19 are bent horizontally outward to provide upper flanges 23. The upper sides of these flanges are in the same horizontal plane with the upper edges of the pans 17 and said flanges and edges are spot-welded together in the present disclosure, as indicated at 24 in Fig. 1. At their outer longitudinal edges, the flanges 23 are provided with vertical flanges 25 which are instrumental in properly alining the two pan sections 15 and 16 when assembling same. In inwardly spaced relation with the flange 25, each flange 23 is equipped with rigidly attached upwardly projecting studs 26 for a purpose to appear.

The upper longitudinal edge portions of the side bars 20 of the upper section 16, are bent horizontally inward to provide flanges 27 which are secured upon the upper sides of the pan covers 18, spot welding being preferably employed here also, as indicated at 28 in Fig. 3. The lower longitudinal edge portions of the side bars 20 are bent horizontally outward to provide flanges 29 to lie upon the flanges 23 as seen in Fig. 8, these flanges 29 being formed with openings 30 to receive the studs 26 above described. By simply resting the upper section 16 of the pan upon the lower section, with the edges of the flanges 29 against the inner sides of the flanges 25, and longitudinally sliding said upper section with respect to the lower section to the proper extent, the openings 30 will aline with the studs 16 and said upper section will drop into position upon said lower section. Attention is invited to the fact that the flanged side bars 19 and 20 are not connected at their ends by any flanged end bars. This materially simplifies construction and facilitates placing of the cover section upon the lower section by a longitudinal sliding movement, which movement is limited at the proper time by the gravity-affected engagement of the studs 26 and openings 30. It is thus possible to initially place the cover section upon the pan section without regard to longitudinal accuracy and to then longitudinally slide said cover section upon said lower section until this sliding movement is limited by engagement of the studs and openings, the cover section being thus engageable more easily with the lower section.

The lower edges of the pan covers 18 are flush with the lower side of the flanges 29 and said edges and flanges are preferably spot welded together as illustrated at 31 in Fig. 4. The tops of these covers 18 are provided with appropriate openings 32 through which to insert a straw or the like for testing purposes, said openings acting also as vents.

From the foregoing taken in connection with the accompanying drawings, it will be seen that novel and advantageous provisions has been made for producing a simple and inexpensive baking pan, yet one which will be effective and durable. Attention is again invited to the possibility of making minor variations over the specific structure herein disclosed.

I claim:

1. In a baking pan, a lower section comprising two straight parallel vertically widened horizontally extending side bars having their upper longitudinal edge portions bent horizontally outward to provide them with straight longitudinal horizontal flanges, and semi-tubular upwardly open pans extending between and secured to said side bars and having their ends closed thereby; a cover section comprising two parallel vertically widened horizontally extending side bars having their lower longitudinal edge portions bent horizontally outward to provide them with straight longitudinal horizontal flanges, and semi-tubular downwardly open pan covers extending between and secured to said cover section side bars and having their ends closed thereby, said straight horizontal flanges of said cover section resting upon said straight horizontal flanges of said lower section; the two of said straight horizontal flanges on one of said sections being each provided with a straight integral vertical longitudinal flange on its outer edge to abut the longitudinal outer edge of the adjacent one of said straight horizontal flanges on the other of said sections to properly position said cover section transversely of said lower section, said vertical and horizontal flanges terminating in exposed end surfaces facing longitudinally away from the ends of the pan, whereby said cover section may be initially engaged with said lower section without regard to longitudinal accuracy and may then be longitudinally slid to proper position, at least one of said horizontal flanges of said lower section and the overlying horizontal flange of said cover section having coacting gravity-engaged means for arresting said sliding of said cover section when it has reached said proper position and for then holding said cover section against sliding in either direction.

2. A structure as specified in claim 1, said coacting gravity-engaged means comprising a projecting stud on one of said horizontal flanges and an opening in the adjacent horizontal flange to receive said stud.

JESSE D. McDONALD.